(12) United States Patent
Kitagawa

(10) Patent No.: US 11,370,452 B2
(45) Date of Patent: Jun. 28, 2022

(54) DRIVING ACTION DETERMINATION DEVICE, DRIVING ACTION DETERMINATION METHOD AND NON-TRANSITORY STORAGE MEDIUM STORING A DRIVING ACTION DETERMINATION PROGRAM

(71) Applicant: TOYOTA JIDOSHA KABUSHIKI KAISHA, Toyota (JP)

(72) Inventor: Takashi Kitagawa, Numazu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 107 days.

(21) Appl. No.: 16/922,420

(22) Filed: Jul. 7, 2020

(65) Prior Publication Data
US 2021/0046948 A1 Feb. 18, 2021

(30) Foreign Application Priority Data
Aug. 13, 2019 (JP) .............................. JP2019-148476

(51) Int. Cl.
| | |
|---|---|
| *B60Q 1/00* | (2006.01) |
| *B60W 50/14* | (2020.01) |
| *B60W 40/105* | (2012.01) |
| *B60W 30/18* | (2012.01) |

(52) U.S. Cl.
CPC .......... *B60W 50/14* (2013.01); *B60W 30/181* (2013.01); *B60W 30/18154* (2013.01); *B60W 40/105* (2013.01); *B60W 2050/146* (2013.01); *B60W 2420/42* (2013.01); *B60W 2520/04* (2013.01)

(58) Field of Classification Search
CPC ............... B60W 50/14; B60W 30/181; B60W 30/18154; B60W 40/105; B60W 2050/146; B60W 2420/42; B60W 2520/04; B60W 2520/10; B60W 2554/4048; B60W 2556/40; B60W 40/09; B60W 2520/06; G06Q 40/08; G06Q 50/30
USPC ...................... 340/438, 439, 905, 908.1, 909
See application file for complete search history.

(56) References Cited

U.S. PATENT DOCUMENTS

| | | | | |
|---|---|---|---|---|
| 2014/0350777 | A1* | 11/2014 | Kawai ................. | G07C 5/0808 |
| | | | | 701/32.3 |
| 2018/0244153 | A1* | 8/2018 | Ejiri ...................... | G02B 27/01 |
| 2019/0080601 | A1* | 3/2019 | Kawabe ................ | B60W 50/00 |
| 2019/0263397 | A1* | 8/2019 | Matsunaga ........... | B60W 40/08 |

FOREIGN PATENT DOCUMENTS

JP 2015-125560 A 7/2015

* cited by examiner

*Primary Examiner* — Anh V La
(74) *Attorney, Agent, or Firm* — Sughrue Mion, PLLC

(57) ABSTRACT

A driving action determination device includes a memory and a processor. The processor is configured to acquire map information which includes information about intersections at which a temporary stop line is provided, specify, based on vehicle behavior information detected by sensors mounted at a vehicle, a direction of approach of the vehicle or a direction of movement of the vehicle towards the temporary stop line, specify, based on the specified direction of approach or direction of movement, a temporary stop line where the vehicle is required to make a temporary stop, and determine, based on the vehicle behavior information, whether or not a temporary stop has been made by the vehicle at the specified temporary stop line.

15 Claims, 7 Drawing Sheets

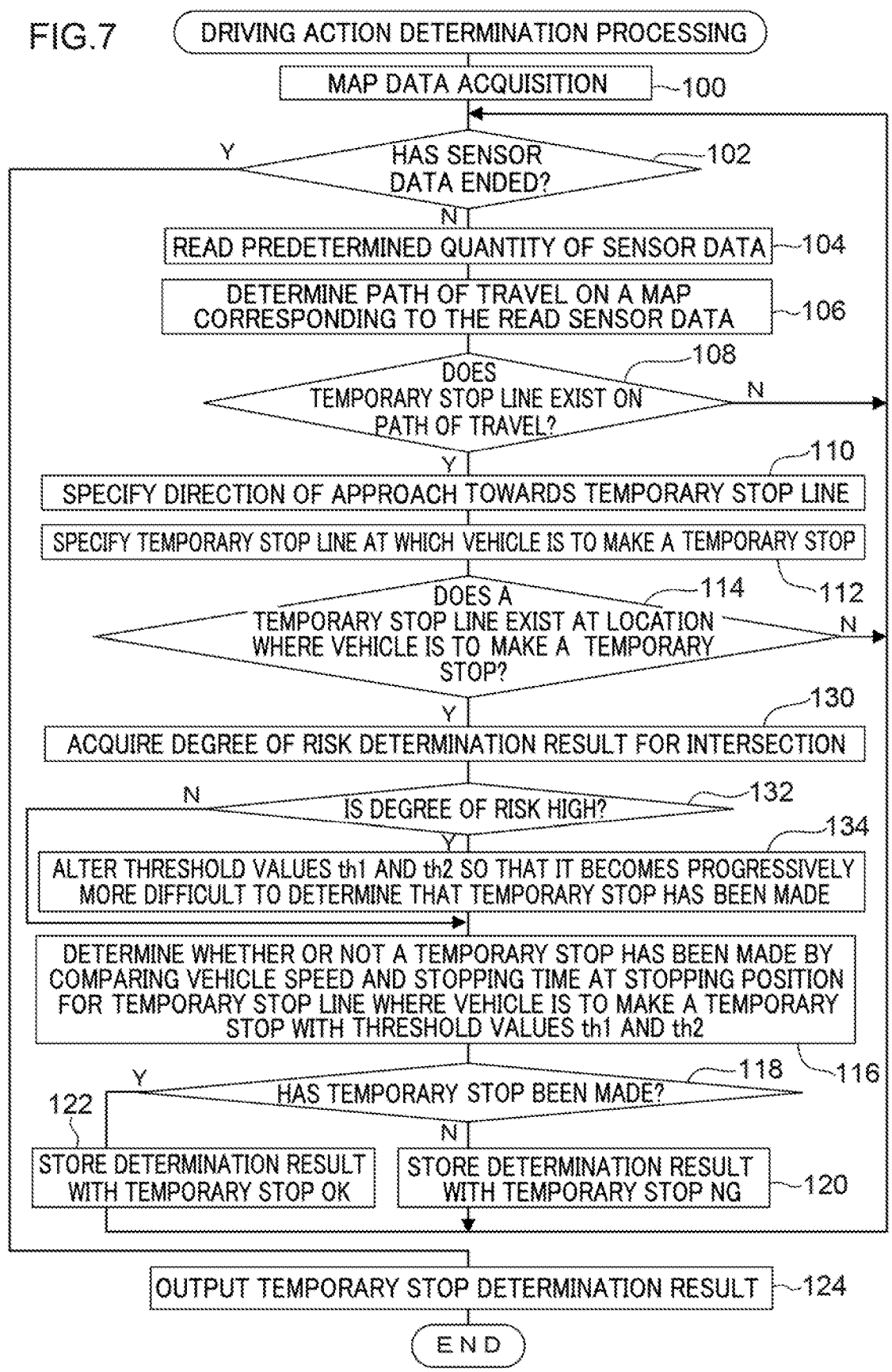

DRIVING ACTION DETERMINATION DEVICE, DRIVING ACTION DETERMINATION METHOD AND NON-TRANSITORY STORAGE MEDIUM STORING A DRIVING ACTION DETERMINATION PROGRAM

CROSS-REFERENCE TO RELATED APPLICATION

This application is based on and claims priority under 35 USC 119 from Japanese Patent Application No. 2019-148476 filed on Aug. 13, 2019, the disclosure of which is incorporated by reference herein.

BACKGROUND

Technical Field

The present disclosure relates to a driving action determination device, a driving action determination method and a non-transitory storage medium on which is stored a driving action determination program.

Related Art

For example, in Japanese Unexamined Patent Application (JP-A) No. 2015-125560, technology is disclosed in which a vehicle traveling state of an automobile from when the automobile nears an intersection until the automobile transits the intersection is detected, and if it is determined from the detected vehicle traveling state that the vehicle did not make a temporary stop in front of the intersection, then it is determined that the driver of the automobile is driving in a risky manner.

For example, in the technology disclosed in JP-A No. 2015-125560, hitherto, there has been a possibility that an automobile might be determined as not making a temporary stop even when that automobile was not required to stop such as when a temporary stop line was provided in an opposing traffic lane, so that there has been room for improvement in the aforementioned conventional technology.

SUMMARY

The present disclosure makes it possible to improve accuracy when determining whether or not a temporary stop has been made at a temporary stop line.

A driving action determination device according to a first aspect includes an acquisition unit that acquires map information which includes information about intersections at which a temporary stop line is provided, a first specifying unit that, based on vehicle behavior information detected by sensors mounted at a vehicle, specifies a direction of approach of a vehicle towards the temporary stop line, a second specifying unit that, based on the direction of approach specified by the first specifying unit, specifies a temporary stop line where the vehicle is required to make a temporary stop, and a determination unit that, based on the vehicle behavior information, determines whether or not a temporary stop has been made by the vehicle at the temporary stop line specified by the second specifying unit.

In the first aspect, a direction of approach of a vehicle towards a temporary stop line is specified based on vehicle behavior information, a temporary stop line where a vehicle is required to make a temporary stop is specified based on the specified approach direction, and a determination is made based on the vehicle behavior information as to whether or not the vehicle made a temporary stop at the specified temporary stop line. In this way, in the first aspect, because temporary stop lines other than temporary stop lines at which a vehicle is required to make a temporary stop are removed from being subject to determinations as to whether or not a temporary has been made, it is possible to improve the accuracy when determining whether or not a vehicle has made a temporary stop at a temporary stop line.

A second aspect is characterized in that, in the first aspect, there is further provided an output unit that displays a result of the determination made by the determination unit on a display unit.

In the second aspect, a person viewing information displayed on a display unit is able to recognize a result of a determination as to whether or not a temporary stop has been made by a vehicle at a temporary stop line at which the vehicle was required to make a temporary stop.

A third aspect is characterized in that, in the first aspect, the determination unit determines whether or not the temporary stop has been made by comparing a speed of the vehicle at a stopping position which takes the specified temporary stop line as a reference with a first threshold value, and by comparing a stopping time of the vehicle at the stopping position with a second threshold value.

In the third aspect, it is possible to determine whether or not a temporary stop has been made via simple processing, namely, by comparing the speed of a vehicle at a stopping position with a first threshold value, and by comparing the stopping time of the vehicle at the stopping position with a second threshold value.

A fourth aspect is characterized in that, in the third aspect, the acquisition unit acquires degree of risk information which shows a degree of risk of an intersection at which a temporary stop line is provided, and the determination unit alters at least one of the first threshold value or the second threshold value based on the degree of risk information acquired by the acquisition unit.

In the fourth aspect, at least one of the first threshold value or the second threshold value is altered in accordance with the degree of risk of the intersection, and it is possible to switch the determination criteria that are used to determine whether or not a vehicle has made a temporary stop at a temporary stop line where that vehicle was required to make a temporary stop in accordance with the degree of risk of that intersection.

A fifth aspect is characterized in that, in the fourth aspect, the determination unit alters at least one of the first threshold value or the second threshold value as the degree of risk shown by the degree of risk information increases, so that it becomes progressively more difficult to determine that the temporary stop has been made.

In the fifth aspect, as the degree of risk of an intersection increases, it only becomes possible to determine whether or not a temporary stop has been made for more reliable temporary stopping actions, so that it is possible to determine whether or not a temporary stopping action has been made that is appropriate to the degree of risk of the intersection.

A sixth aspect is characterized in that, in the fourth aspect, the degree of risk information is set based on a result obtained when a determination unit determines a degree of visibility at an intersection from images acquired by an image acquisition unit that is mounted at the vehicle.

In the sixth aspect, because the degree of risk information is set for intersections through which a vehicle has transited, even when it is not possible to obtain degree of risk information for all intersections it is still possible to acquire degree of risk information for intersections through which the vehicle has transited.

A driving action determination method according to a seventh aspect includes a step in which map information which includes information about intersections at which a temporary stop line is provided is acquired, a step in which a direction of approach of a vehicle or a direction of movement of a vehicle towards the temporary stop line is specified based on vehicle behavior information detected by sensors mounted at the vehicle, a step in which a temporary stop line where the vehicle is required to make a temporary stop is specified based on the specified direction of approach or direction of movement, and a step in which whether or not a temporary stop has been made by the vehicle at the specified temporary stop line is determined based on the vehicle behavior information, and this method is performed via processing executed by a computer.

In the seventh aspect, in the same way as the first aspect, it is possible to improve the accuracy when determining whether or not a temporary stop has been made at a temporary stop line.

A driving action determination program according to an eighth aspect causes a computer to execute processing which includes acquiring map information which includes information about intersections at which a temporary stop line is provided, specifying a direction of approach of a vehicle or a direction of movement of a vehicle towards the temporary stop line based on vehicle behavior information detected by sensors mounted at the vehicle, specifying a temporary stop line where the vehicle is required to make a temporary stop based on the specified direction of approach or direction of movement, and determining whether or not a temporary stop has been made by the vehicle at the specified temporary stop line based on the vehicle behavior information.

In the eighth aspect, in the same way as the first aspect, it is possible to improve the accuracy when determining whether or not a temporary stop has been made at a temporary stop line.

The present disclosure makes it possible to improve accuracy when determining whether or not a temporary stop has been made at a temporary stop line.

BRIEF DESCRIPTION OF THE DRAWINGS

Exemplary embodiments of the present disclosure will be described in detail based on the following figures, wherein:

FIG. 7 is a flowchart showing driving action determination processing according to the second exemplary embodiment.

DETAILED DESCRIPTION

Hereinafter, examples of exemplary embodiments for implementing the present disclosure will be described in detail with reference to the drawings.

First Exemplary Embodiment

Figure 1:
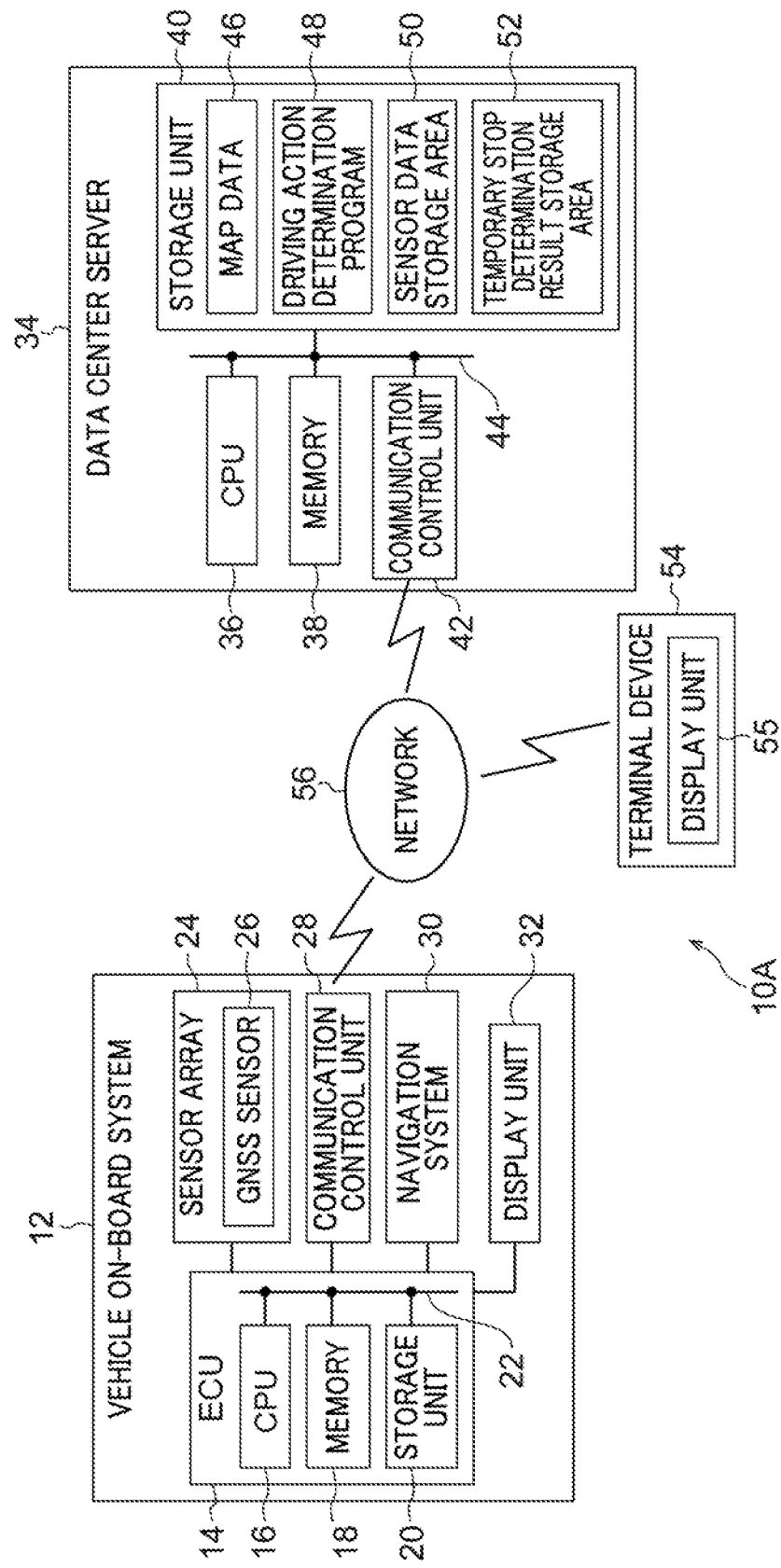
FIG. 1 is a block diagram showing the schematic structure of a driving action determination system according to a first exemplary embodiment.

As is shown in FIG. 1, a driving action determination system 10A according to a first exemplary embodiment includes a vehicle on-board system 12 that is mounted at a vehicle, a data center server 34 (hereinafter, referred to simply as a server 34), and a terminal device 54. In the vehicle on-board system 12, the server 34 and the terminal device 54 are able to communicate with each other via a network 56. Note that in FIG. 1, only one vehicle on-board system 12 is shown, however, vehicle on-board systems 12 are mounted at each of a plurality of vehicles. The terminal device 54 is formed, for example, by a smartphone or the like, and includes a display unit 55, and is carried by a family member or the like of a driver driving the vehicle in which the vehicle on-board system 12 is mounted.

The vehicle on-board system 12 is provided with an ECU (Electronic Control Unit) 14. The ECU 14 includes a CPU (Central Processing Unit) 16, memory 18 such as ROM (Read Only Memory) and RAM (Random Access Memory), and a non-volatile storage unit 20 such as an HDD (hard Disk Drive) or an SSD (Solid State Drive). The CPU 16, the memory 18, and the storage unit 20 are mutually connected via an internal bus 22 so as to be able to communicate with each other.

A sensor array 24, a communication control unit 28 that governs communications with the vehicle on-board system 12 and the server 34 and the like, a navigation system 30, and a display unit 32 that is capable of displaying desired information are connected to the ECU 14.

The sensor array 24 is provided with a plurality of sensor types including a GNSS (Global Navigation Satellite System) sensor 26 that acquires GNSS measurement information by receiving measurement signals from GNSS satellites. Examples of sensors other than the GNSS sensor 26 included in the sensor array 24 include a vehicle speed sensor that detects a vehicle speed, an acceleration sensor that detects a vehicle acceleration, and a steering angle sensor that detects a vehicle steering wheel angle. Each sensor of the sensor array 24 detects various types of physical quantities for predetermined time intervals while the ignition switch of the vehicle is turned on. The ECU 14 transmits sensor data output from the sensor array 24 at predetermined time intervals to the server 34 whenever such transmissions are required. Note that the sensor data is an example of vehicle behavior information.

The navigation system 30 includes a storage unit (not shown in the drawings) which stores map information and, based on the GNSS measurement information output from the GNSS sensor 26 and on the map information stored in the storage unit, performs processing such as displaying the position of its own host vehicle on a map displayed on the display unit 32, and indicating a route to a destination.

The server 34 includes a communication control unit 42 that governs communications between the vehicle on-board system 12 and the like and a CPU 36 which serves as a processor, memory 38, a storage unit 40 which serves as a memory or as a non-volatile, non-transitory storage medium, and the server 34. The CPU 36, the memory 38, the storage unit 40, and the communication control unit 42 are connected together so as to be able to communicate with each other via an internal bus 44. Map data 46 which serves as map information, and a driving action determination program 48 are stored in the storage unit 40, and a sensor data storage area 50 and a temporary stop determination result storage area 52 are also provided in the storage unit 40

Figure 2:
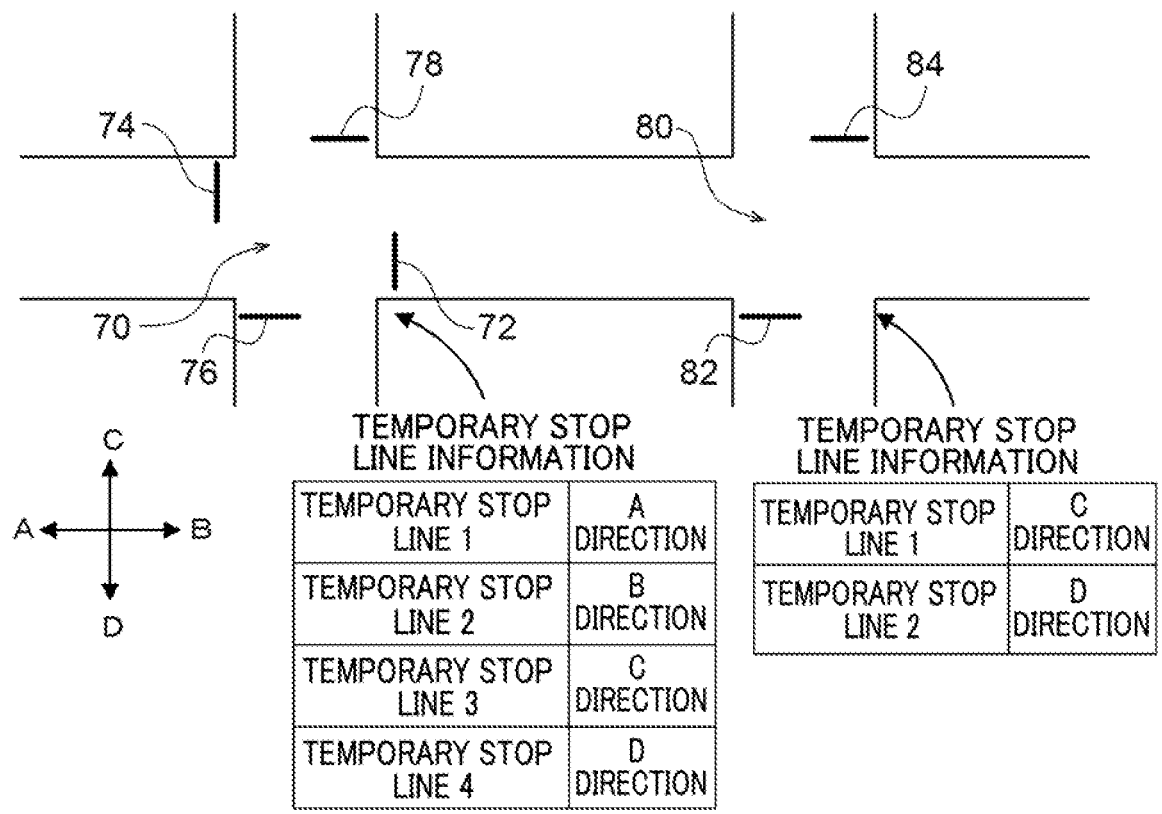
FIG. 2 is an image diagram showing an outline of map data.

As is shown in FIG. 2, the map data 46 includes temporary stop line information that is set individually for each intersection at which a temporary stop line is provided out of the intersections present on the map shown by the map data 46. This temporary stop line information includes information showing a direction of approach of a vehicle which is required to make a temporary stop relative to each individual temporary stop line provided at an intersection.

For example, in the case of an intersection 70 at which temporary stop lines 72, 74, 76, and 78 are provided, these temporary stop lines 72, 74, 76, and 78 are set such that vehicles entering in the direction shown by the arrow A in FIG. 2 are required to make a temporary stop at the temporary stop line 72, vehicles entering in the direction shown by the arrow B in FIG. 2 are required to make a temporary stop at the temporary stop line 74, vehicles entering in the direction shown by the arrow C in FIG. 2 are required to make a temporary stop at the temporary stop line 76, and vehicles entering in the direction shown by the arrow D in FIG. 2 are required to make a temporary stop at the temporary stop line 78.

Furthermore, for example, in the case of an intersection 80 at which temporary stop lines 82, and 84 are provided, these temporary stop lines 82 and 84 are set such that vehicles entering in the direction shown by the arrow C in FIG. 2 are required to make a temporary stop at the temporary stop line 82, and vehicles entering in the direction shown by the arrow D in FIG. 2 are required to make a temporary stop at the temporary stop line 84.

Note that the temporary stop line information may, for example, be information that designates the direction of approach of a vehicle which is required to make a temporary stop using values indicating compass directions. For example, a numerical range from 0 to 3600 may be used for the values indicating compass directions. As an example, if the direction of approach of a vehicle which is required to make a temporary stop is from the north, then the value showing this direction of approach (as a compass direction) is 1800.

Figure 3:
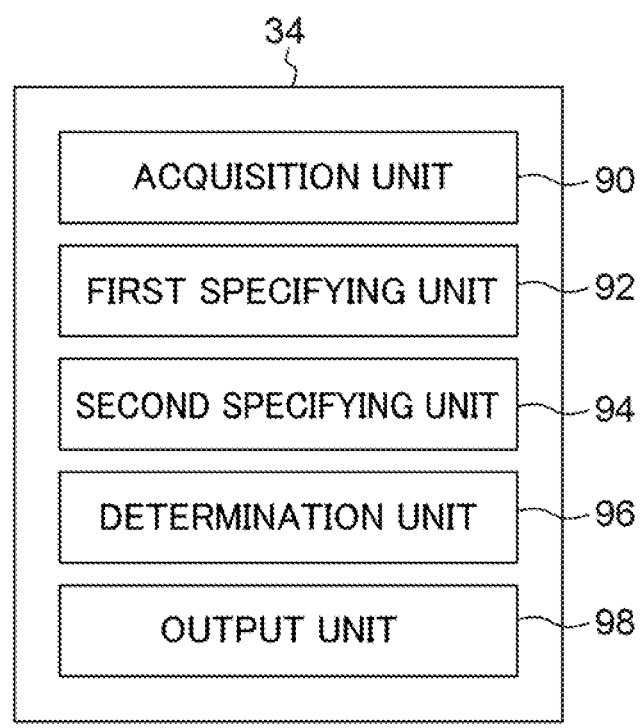
FIG. 3 is a function block diagram of a server.

The server 34 performs driving action determination processing (described below) by being made to function as an acquisition unit 90, a first specifying unit 92, a second specifying unit 94, a determination unit 96, and an output unit 98 (see FIG. 3) as a result of the driving action determination program 48 being read from the storage unit 40 and expanded in the memory 38, and then as a result of this driving action determination program 48 that has been expanded in the memory 38 being subsequently executed by the CPU 36. As a consequence, the server 34 is made to function as an example of a driving action determination device. In addition, each time the server 34 receives sensor data from the vehicle on-board system 12, the server 34 causes the received sensor data to be stored in the sensor data storage area 50. As a result, sensor data is stored by being accumulated in chronological order in the sensor data storage area 50.

Figure 4:
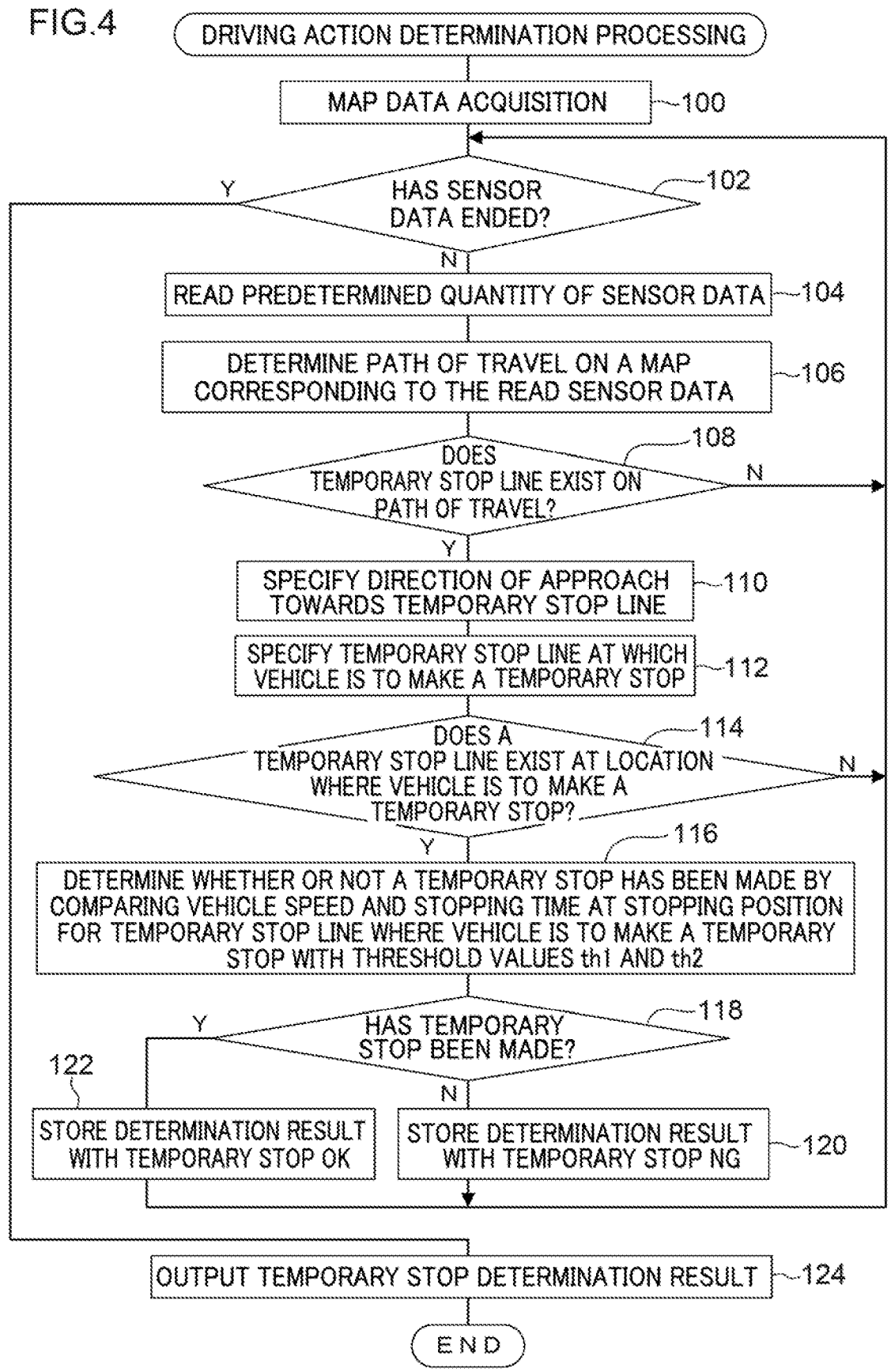
FIG. 4 is a flowchart showing driving action determination processing according to the first exemplary embodiment.

Next, an action of the first exemplary embodiment will be described. The server 34 executes the driving action determination processing shown in FIG. 4 at regular intervals (for example, at a frequency of between once a day and once a week, and for each vehicle on-board system 12 (i.e. for each driver). In step 100, the acquisition unit 90 acquires the map data 46 from the storage unit 40.

In step 102, the acquisition unit 90 determines whether or not all of the sensor data has been read from the sensor data storage area 50 of the storage unit 40. If the result of the determination in step 102 is negative, the routine moves to step 104. In step 104, the acquisition unit 90 reads a predetermined quantity of sensor data from the sensor data storage area 50 of the storage unit 40.

Figure 5:
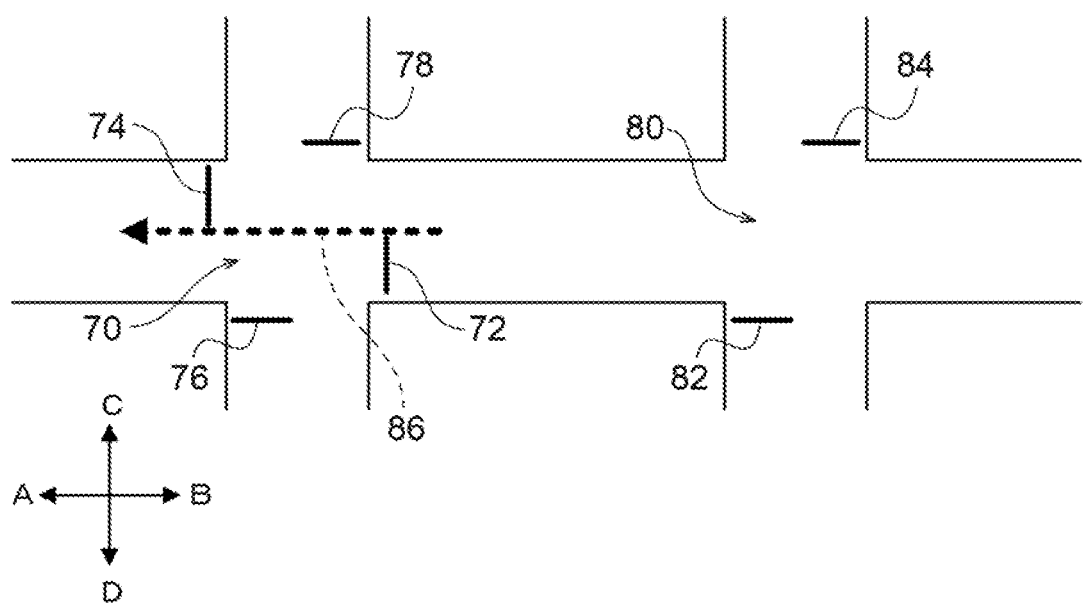
FIG. 5 is an image diagram showing an example of a travel trajectory of a vehicle on a map and temporary stop lines present on that travel trajectory.

In step 106 the first specifying unit 92 plots the position of the vehicle, which is shown by the time-series GNSS measurement information contained in the sensor data read in step 104, on a map which is shown by the map data 46 acquired in step 100. As a result, the first specifying unit 92 determines the travel trajectory of the vehicle on a map corresponding to the read sensor data. In FIG. 5, the symbol 86 indicates an example of a determined travel trajectory.

In step 108, the first specifying unit 92 determines whether or not a temporary stop line is present on the determined travel trajectory by verifying the travel trajectory determined in step 106 against the temporary stop line information in the map data 46. For example, if the determined travel trajectory is the travel trajectory 86 shown in FIG. 5, the temporary stop lines 72 and 74 are extracted as being temporary stop lines present on that travel trajectory. If no temporary stop lines are present on the determined travel trajectory, the result of the determination in step 108 is negative and the routine returns to step 102.

If, however, a temporary stop line is present on the determined travel trajectory, the result of the determination in step 108 is affirmative and the routine moves to step 110. In step 110, based on the sensor data read in step 104, the first specifying unit 92 specifies the direction of approach of a vehicle towards the temporary stop line present on the travel trajectory by specifying the direction of approach of the vehicle on the travel trajectory determined in step 106. For example, in the example shown in FIG. 5, the direction of approach of the vehicle towards the temporary stop lines 72 and 74 is specified as being the direction indicated by the arrow A in FIG. 5.

In step 112, the second specifying unit 94 specifies temporary stop lines where the vehicle is required to make a temporary stop on the determined travel trajectory by verifying the direction of approach of the vehicle towards the temporary stop lines determined in step 110 against the temporary stop line information contained in the map data 46. For example, in the example shown in FIG. 5, the temporary stop line 72 where the direction of approach of the vehicle which is required to make a temporary stop coincides with the determined direction of approach of a vehicle towards the temporary stop line is specified as being a temporary stop line at which the vehicle is required to make a temporary stop. In contrast, because the direction of approach of the vehicle which is required to make a temporary stop does not coincide with the determined direction of approach of a vehicle towards the temporary stop line at the temporary stop line 74, the temporary stop line 74 is excluded from the temporary stop lines at which the vehicle is required to make a temporary stop.

Next, in step 114, based on the result of the processing of step 112, the determination unit 96 determines whether or not a temporary stop line at which the vehicle will be required to make a temporary stop is present on the travel trajectory of the vehicle. If the result of determination in step 114 is negative, the routine returns to step 102, while if the result of determination in step 114 is affirmative, the routine moves to step 116.

In step 116, based on the sensor data read in step 104, the determination unit 96 compares the vehicle speed at a stopping position which takes the temporary stop line at which the vehicle is required to make a temporary stop as a reference with a first threshold value th1 (for example, 0 [km/h]), and also compares the vehicle stopping time at this stopping position with a second threshold value th2 (for example, 3 [sec]). By determining whether the vehicle speed at the stopping position is equal to or less than the first threshold value th1, and also whether the vehicle stopping time at the stopping position is equal to or greater than the second threshold value th2, the determination unit 96 determines whether or not the vehicle has made a temporary stop at the stopping position.

Note that when making this determination as to whether or not a vehicle has made a temporary stop, it is also possible to use the vehicle acceleration for the determination in addition to the vehicle speed and the vehicle stopping time.

In step 118, based on the result of the determination in step 116, the determination unit 96 determines whether or not a temporary stop has been made at the stopping position which takes the temporary stop line at which a vehicle is required to make a temporary stop as a reference. If it is determined that a temporary stop has been made (i.e., if the temporary stop is OK), the result of the determination in step 118 is affirmative and the routine moves to step 122. In step 122, the determination unit 96 stores the determination result showing that the temporary stop was OK together with supplementary information such as the driver's ID, sensor data, and date and time information, and the like in the temporary stop determination result storage area 52. Once the processing of step 122 has been performed, the routine returns to step 102.

If, on the other hand, it is determined that a temporary stop has not been made (i.e., if the temporary stop was NG), the result of the determination in step 118 is affirmative and the routine moves to step 120. In step 120, the determination unit 96 stores the determination result showing that the temporary stop was NG together with supplementary information such as the driver's ID, sensor data, date and time information, and position information for the corresponding temporary stop line and the like in the temporary stop determination result storage area 52. Once the processing of step 120 has been performed, the routine returns to step 102.

As a result, by repeating the processing of step 102 through step 120 until the determination in step 102 is affirmative, each time it is determined that a temporary stop line at which a vehicle is required to make a temporary stop is present on the travel trajectory of that vehicle, whether or not the vehicle made the temporary stop is determined, and the result of the determination about the temporary stop is stored together with supplementary information in the temporary stop determination result storage area 52.

If the result of the determination in step 102 is affirmative the routine moves to step 124. In step 124, the output unit 98 outputs the determination result for the temporary stop that has been stored in the temporary stop determination result storage area 52 to at least one of the vehicle on-board system 12 and the terminal device 54, and the driving action determination processing is ended. This processing is an example of the processing performed by the output unit. Note that, when the determination result for the temporary stop is being output, this determination result for the temporary stop may be output in an unmodified form, or may be output as a graph showing the ratio of OK temporary stops to NG temporary stops or the like.

The determination result for the temporary stop that is output in step 124 is displayed on at least one of the display unit 32 of the vehicle on-board system 12 or the display unit 55 of the terminal device 55. As a result, it is possible to enable a driver and family members of that driver and the like to recognize whether or not the driver is performing driving actions such as not stopping at temporary stop lines.

Note that the vehicle on-board system 12 may also perform the following notification processing when receiving temporary stop determination results and supplementary information from the server 34 and storing them in the storage unit 20. Namely, when the position of a vehicle as detected by the GNSS sensor 26 approaches a temporary stop line contained in the supplementary information, the vehicle on-board system 12 may notify the driver, for example, via the display unit 32 that a temporary stop line that has received an NG temporary stop determination result is approaching. By performing this processing, a driver can be induced to perform a safe driving action by making a temporary stop at a temporary stop line where NG temporary stop determinations have previously been made.

Furthermore, it is also possible for temporary stop determination results stored in the temporary stop determination result storage area 52 to be used, for example, to calculate automobile insurance premiums.

In this way, in the first exemplary embodiment, map data 46 including information about intersections where a temporary stop line is provided is acquired, and the direction of approach of a vehicle towards the temporary stop line is specified based on sensor data detected by the sensor array 24 mounted at the vehicle. Additionally, based on the direction of approach of a vehicle towards a temporary stop line, temporary stop lines at which the vehicle is required to make a temporary stop are specified, and whether or not the vehicle has made a temporary stop at the temporary stop line where that vehicle was required to make a temporary stop is determined based on sensor data. As a result, by excluding temporary stop lines other than temporary stop lines at which a vehicle is required to make a temporary stop from being subject to determinations as to whether or not a temporary stop has been made, it is possible to improve the accuracy when determining whether or not a temporary stop has been made at a temporary stop line.

Moreover, in the first exemplary embodiment, the result of a determination as to whether or not a vehicle has made a temporary stop at a temporary stop line where that vehicle was required to make a temporary stop is displayed on at least one of the display unit 32 of the vehicle or the display unit 55 of the terminal device 54. As a result, at least one of the driver or a family member thereof is able to recognize the result of the determination as to whether or not the vehicle has made a temporary stop at a temporary stop line where that vehicle was required to make a temporary stop.

In addition, in the first exemplary embodiment, whether or not a temporary stop has been made is determined by comparing the speed of the vehicle at a stopping position which takes the temporary stop line where the vehicle is required to make a temporary stop as a reference with the first threshold value th1, and by comparing a stopping time of the vehicle at the stopping position which takes the temporary stop line where the vehicle is required to make a temporary stop as a reference with a second threshold value th2. As a result, it is possible to determine whether or not a temporary stop has been made via simple processing, namely, by comparing the speed of a vehicle at a stopping position with the first threshold value th1, and by comparing the stopping time of the vehicle at the stopping position with the second threshold value th2.

Second Exemplary Embodiment

Next, a second exemplary embodiment of the present disclosure will be described. Note that component elements that are the same as in the first exemplary embodiment are given the same descriptive symbols and any detailed description thereof is omitted.

Figure 6:
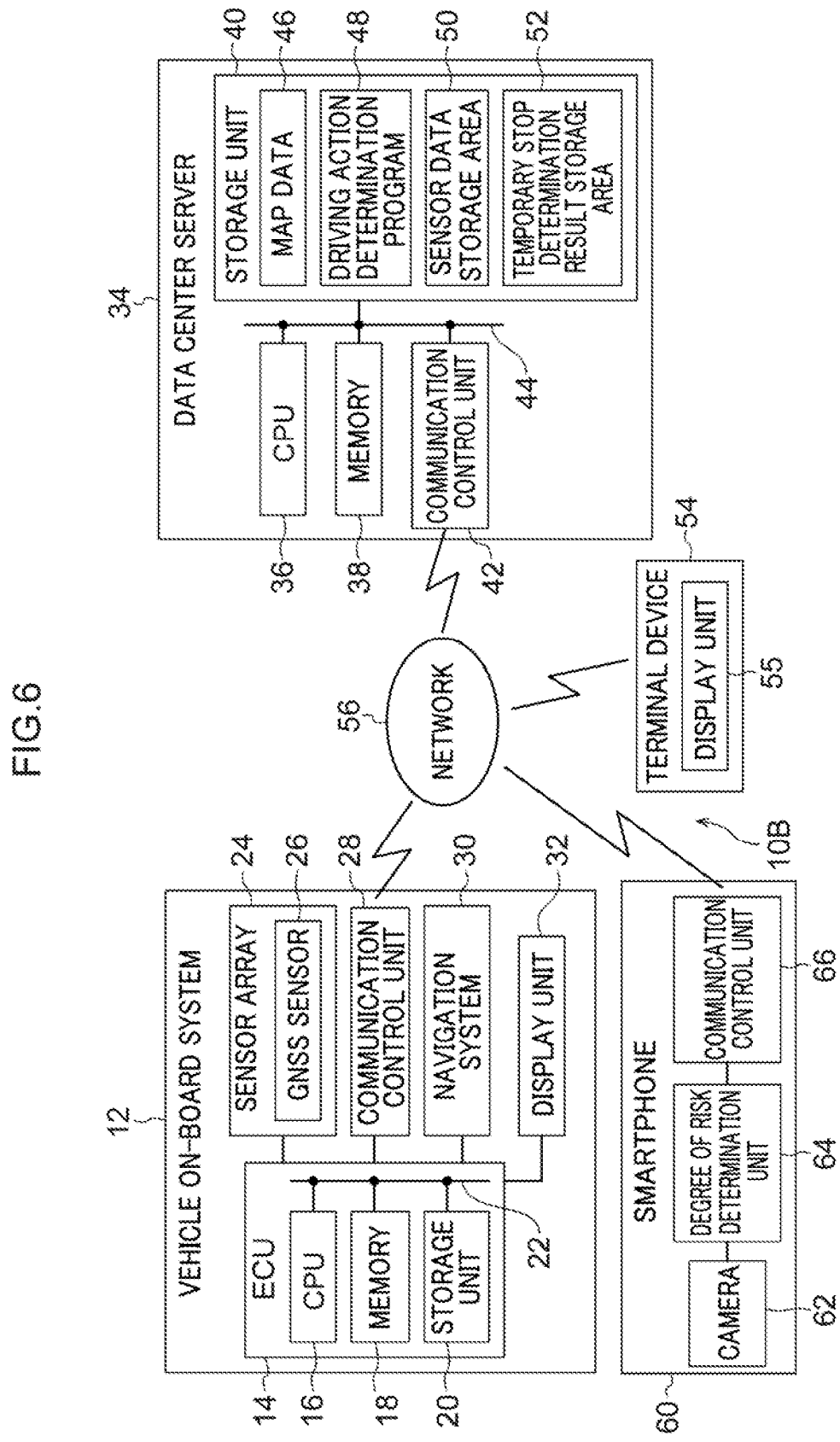
FIG. 6 is a block diagram showing the schematic structure of a driving action determination system according to a second exemplary embodiment.

As is shown in FIG. 6, in a driving action determination system 10B according to a second exemplary embodiment, there is provided a mobile information terminal such as, for example, a smartphone 60 that is carried by the driver of a vehicle. The smartphone 60 is provided with a camera 62, a degree of risk determination unit 64, and a communication control unit 66. While the driver is on board the vehicle, the smartphone 60 is placed in a holder or the like that enables the camera 62 to photograph the area in front of the vehicle. Note that the camera 63 is an example of an image acquisition unit, and the degree of risk determination unit 64 is an example of a determination unit.

The degree of risk determination unit 64 is realized as a result of an application being executed by the smartphone 60. Based on images acquired by the camera 62, the degree of risk determination unit 64 determines the degree of visibility at an intersection transited by a vehicle as being the degree of risk of that intersection. Note that this degree of visibility at an intersection is determined by deciding whether or not other vehicles approaching a temporary stop line from the left or right can be seen, on whether or not structures are present on the left or right, on the road width, and on whether or not road-side mirrors have been installed on the left or right sides, and the like.

When visibility at an intersection is determined to be good, the degree of risk determination unit 64 outputs information showing that the degree of risk of an intersection is low as the degree of risk information, and when visibility at an intersection is determined to be poor, the degree of risk determination unit 64 outputs information showing that the degree of risk of an intersection is high as the degree of risk information. The degree of risk information output from the degree of risk determination unit 64 is transmitted by the communication control unit 66 to the server 34 whenever such transmissions are required, and is stored in the storage unit 40 of the server 34.

Next, driving action determination processing according to the second exemplary embodiment will be described with reference to FIG. 7 focusing principally on those portions thereof that are different from the first exemplary embodiment. In the driving action determination processing according to the second exemplary embodiment, when, as a result of a temporary stop line where a vehicle is required to make a temporary stop being present on the travel trajectory of that vehicle, the result of the determination in step 114 is affirmative, the routine moves to step 130.

In step 130, out of the degree of risk information received from the smartphone 60 and stored in the storage unit 40, the determination unit 96 reads from the storage unit 40 degree of risk information for the intersections corresponding to temporary stop lines at which the vehicle is required to make a temporary stop that are present on the travel trajectory of that vehicle. Next, in step 132, the determination unit 96 determines whether or not the degree of risk information for intersections that was read in step 130 shows a high degree of risk. If the result of the determination in step 132 is negative, the routine moves to step 116.

If, however the result of the determination in step 132 is affirmative, the routine moves to step 134. In step 134, the determination unit 96 alters at least one of the first threshold value th1 or the second threshold value th2 so that it becomes progressively more difficult to determine whether a temporary stop has been made, and the routine then moves to step 116. Note that making it more difficult to determine whether a temporary stop has been made can be achieved by performing at least one of altering the first threshold value th1 which relates to the vehicle speed at the stopping position to a lower value, or altering the second threshold value th2 which relates to the stopping time at the stopping position to a higher value.

By altering the threshold value(s) in step 134, for an intersection which is determined to have a high degree of risk due to poor visibility, if a more reliable temporary stopping action has been performed, it is determined that a temporary stop has been made, and it becomes possible to determine that an appropriate temporary stopping action has been made in accordance with the degree of risk of the intersection.

In this way, in the second exemplary embodiment, degree of risk information which shows a degree of risk at an intersection at which a temporary stop line is provided is acquired, and at least one of the first threshold value th1 or the second threshold value th2 is altered based on this acquired degree of risk information. As a consequence, it is possible to switch the determination criteria as to whether or not a vehicle has made a temporary stop at a temporary stop line where that vehicle is required to make a temporary stop in accordance with the degree of risk of an intersection.

Moreover, in the second exemplary embodiment, at least one of the first threshold value or the second threshold value is altered so that it becomes progressively more difficult to determine that a temporary stop has been made as the degree of risk which is shown by the degree of risk information increases. As a consequence, as the degree of risk at an intersection becomes progressively greater, it is only determined that a temporary stop has been made for more reliable temporary stopping actions, and it becomes possible to determine whether an appropriate temporary stopping action has been made in accordance with the degree of risk of an intersection.

Furthermore, in the second exemplary embodiment, the degree of risk information is set based on the results obtained when the degree of risk determination unit 64 determines the degree of visibility at an intersection from images acquired by the camera 62 of the smartphone 60 that is mounted at the vehicle. By employing this structure, even in situations in which it has not been possible to obtain degree of risk information for all intersections, it is still possible to acquire degree of risk information for an intersection transited by the vehicle.

Note that in the second exemplary embodiment, instead of the camera 62 of the smartphone 60 and the degree of risk determination unit 64, it is also possible to acquire images using the camera of a drive recorder and to then determine the degree of risk of an intersection using the processing device built into the drive recorder.

Additionally, in the second exemplary embodiment, an aspect is described in which the degree of visibility at an intersection is used as an index to determine the degree of risk of that intersection, however, the present disclosure is not limited to this. For example, it is also possible to set intersections where it is difficult to make a determination from acquired images and where accidents are frequent, and intersections located in a school zone and the like as being intersections having a high degree of risk. In this case, by including degree of risk information for intersections in advance in the map data 46, intersections such as those described above can be determined to be intersections having a high degree of risk.

Moreover, in the second exemplary embodiment, an aspect is described in which the threshold values for determining a temporary stop are switched in accordance with the degree of risk of an intersection so that a temporary stop determination can be made for all of the intersections where a temporary stop line is provided. However, the present disclosure is not limited to this, and it is also possible to determine whether or not a temporary stop has been made solely for intersections that have a high degree of risk.

Moreover, the map information may also show the directions in which roads extend away from an intersection simply as approximately east-west or north-south directions, and in this case the temporary stop information contained in the map information may simply show whether or not a temporary stop line exists relative to a direction in which a road extends. For example, the above-described temporary stop line information shows that the temporary stop lines 72 and 74 that control the directions A and B in FIG. 2 exist for the intersection 70 shown in FIG. 2, and that the temporary stop lines 76 and 78 that control the directions C and D in FIG. 2 exist for the intersection 70 shown in FIG. 2. In cases such as this, instead of the direction of approach of a vehicle towards a temporary stop line, the first specifying unit 96 specifies the direction of movement of the vehicle, so that the second specifying unit 94 is able to specify temporary stop lines where the vehicle is required to make a temporary stop. The present disclosure also includes aspects such as this.

Furthermore, the above description describes processing performed for a temporary stop line that is provided at an intersection, however, the present disclosure is not limited to this, and it is also possible for the above processing to be performed for temporary stop lines provided at locations other than intersections.

In addition, the above description describes an aspect in which the driving action determination processing (see FIG. 4 and FIG. 7) is executed by the server 34, however, the present disclosure is not limited to this, and the driving action determination processing may instead be executed by the vehicle on-board system 12. In this case, the vehicle on-board system 12 functions as a driving action determination device.

Moreover, the above description describes an aspect in which the driving action determination processing (see FIG. 4 and FIG. 7) is executed at regular intervals (for example, at a frequency of between once a day and once a week), however, the present disclosure is not limited to this, and it is also possible for driving actions such as whether or not a vehicle is making a temporary stop to be determined in real time.

Furthermore, the processing performed by the server 34 in each of the above-described exemplary embodiments is described as being software processing which is performed as a result of a program being executed, however, the present disclosure is not limited to this. For example, the processing may also be performed by hardware. Alternatively, the processing may be performed by a combination of both software and hardware. Additionally, if the processing is software processing, then a program may be stored on various types of non-transitory storage medium such as a DVD (Digital Versatile Disk) or the like and distributed, and then executed by a processor such as the CPU 36 of the server 34, or the CPU 16 of the vehicle on-board system 12 or the like.

Exemplary embodiments of the present disclosure have been described above, however, the present disclosure is not limited to these. Various modifications and the like may be made to the present disclosure insofar as they do not depart from the spirit or scope of the present disclosure.

What is claimed is:

1. A driving action determination device comprising a memory and a processor, wherein the processor is configured to:
    acquire map information which includes information about intersections at which a temporary stop line is provided;
    specify, based on vehicle behavior information detected by sensors mounted at a vehicle, a direction of approach of the vehicle or a direction of movement of the vehicle towards the temporary stop line;
    specify, based on the specified direction of approach or direction of movement, a temporary stop line where the vehicle is required to make a temporary stop; and
    determine, based on the vehicle behavior information, whether or not a temporary stop has been made by the vehicle at the specified temporary stop line,
    wherein the processor is configured to determine whether or not the temporary stop has been made by comparing a speed of the vehicle at a stopping position, which takes the specified temporary stop line as a reference, with a first threshold value, and by comparing an amount of a stopping time of the vehicle at the temporary stop line with a second threshold value.

2. The driving action determination device according to claim 1, wherein the processor is configured to display a result of the determination on a display unit.

3. The driving action determination device according to claim 1, wherein the processor is configured to:
    acquire degree of risk information which shows a degree of risk of an intersection at which a temporary stop line is provided; and
    alter at least one of the first threshold value or the second threshold value based on the acquired degree of risk information.

4. The driving action determination device according to claim 3, wherein the processor is configured to alter at least one of the first threshold value or the second threshold value as the degree of risk shown by the degree of risk information increases, so that it becomes progressively more difficult to determine that the temporary stop has been made.

5. The driving action determination device according to claim 3, wherein the processor is configured to set the degree of risk information based on a result obtained when a determination unit determines a degree of visibility at an intersection from images acquired by an image acquisition unit that is mounted at the vehicle.

6. A driving action determination method performed by a processor, the method comprising:
    acquiring map information which includes information about intersections at which a temporary stop line is provided;
    specifying, based on vehicle behavior information detected by sensors mounted at a vehicle, a direction of approach of the vehicle or a direction of movement of the vehicle towards the temporary stop line;
    specifying, based on the specified direction of approach or direction of movement, a temporary stop line where the vehicle is required to make a temporary stop; and determining, based on the vehicle behavior information, whether or not a temporary stop has been made by the vehicle at the specified temporary stop line, wherein the determining of whether or not the temporary stop has been made by the vehicle at the specified temporary stop line comprises comparing a speed of the vehicle at a stopping position, which takes the specified temporary stop line as a reference, with a first threshold value, and comparing an amount of a stopping time of the vehicle at the temporary stop line with a second threshold value.

7. The driving action determination method according to claim 6, further comprising:

displaying a result of the determination on a display unit.

8. The driving action determination method according to claim 6, further comprising:

acquiring degree of risk information which shows a degree of risk of an intersection at which a temporary stop line is provided; and altering at least one of the first threshold value or the second threshold value based on the acquired degree of risk information.

9. The driving action determination method according to claim 8, further comprising altering at least one of the first threshold value or the second threshold value as the degree of risk shown by the degree of risk information increases, so that it becomes progressively more difficult to determine that the temporary stop has been made.

10. The driving action determination method according to claim 8, further comprising setting the degree of risk information based on a result obtained when a determination unit determines a degree of visibility at an intersection from images acquired by an image acquisition unit that is mounted at the vehicle.

11. A non-transitory storage medium on which is stored a program that is executable by a processor to perform driving action determination processing in which:

map information which includes information about intersections at which a temporary stop line is provided is acquired;

a direction of approach of a vehicle or a direction of movement of the vehicle towards the temporary stop line is specified based on vehicle behavior information detected by sensors mounted at the vehicle;

a temporary stop line where the vehicle is required to make a temporary stop is specified based on the specified direction of approach or direction of movement; and whether or not a temporary stop has been made by the vehicle at the specified temporary stop line is determined based on the vehicle behavior information, wherein whether or not a temporary stop has been made by the vehicle at the specified temporary stop line is determined by comparing a speed of the vehicle at a stopping position, which takes the specified temporary stop line as a reference, with a first threshold value, and comparing an amount of a stopping time of the vehicle at the temporary stop line with a second threshold value.

12. The non-transitory storage medium according to claim 11, wherein, in the driving action determination processing, a result of the determination is displayed on a display unit.

13. The non-transitory storage medium according to claim 11, wherein, in the driving action determination processing:

degree of risk information that shows a degree of risk of an intersection at which a temporary stop line is provided is acquired; and at least one of the first threshold value or the second threshold value is altered based on the acquired degree of risk information.

14. The non-transitory storage medium according to claim 13, wherein, in the driving action determination processing, at least one of the first threshold value or the second threshold value is altered as the degree of risk shown by the degree of risk information increases, so that it becomes progressively more difficult to determine that the temporary stop has been made.

15. The non-transitory storage medium according to claim 13, wherein, in the driving action determination processing, the degree of risk information is set based on a result obtained when a determination unit determines a degree of visibility at an intersection from images acquired by an image acquisition unit that is mounted at the vehicle.

* * * * *